(12) United States Patent
Piazzi et al.

(10) Patent No.: US 8,995,570 B2
(45) Date of Patent: Mar. 31, 2015

(54) METHODS AND SYSTEMS FOR BEAM STEERING CREST FACTOR REDUCTION (CFR) CLIP NOISE

(71) Applicant: FutureWei Technologies, Inc., Plano, TX (US)

(72) Inventors: Leonard Piazzi, Denville, NJ (US); Zhengxiang Ma, Summit, NJ (US)

(73) Assignee: FutureWei Technologies, Inc., Plano, TX (US)

( * ) Notice: Subject to any disclaimer, the term of this patent is extended or adjusted under 35 U.S.C. 154(b) by 23 days.

(21) Appl. No.: 13/797,408

(22) Filed: Mar. 12, 2013

(65) Prior Publication Data

US 2014/0270016 A1 Sep. 18, 2014

(51) Int. Cl.
*H04K 1/02* (2006.01)
*H04B 1/10* (2006.01)

(52) U.S. Cl.
CPC .................................. *H04B 1/10* (2013.01)
USPC ........... 375/297; 375/260; 375/295; 375/296; 375/285

(58) Field of Classification Search
CPC ............ H04L 27/2624; H04L 27/2623; H04L 27/2614; H04L 27/2647; H04L 5/0007; H04L 1/0668; H04L 27/2628; H04L 27/263; H04B 7/068; H04B 1/0483; H04B 7/0617; H04B 1/10; H03F 2200/405; H03F 2200/435

USPC .......................... 375/297, 260, 285, 295, 296
See application file for complete search history.

(56) References Cited

U.S. PATENT DOCUMENTS

2012/0300824 A1 11/2012 Maehata et al.
2014/0106691 A1* 4/2014 Chapman et al. .......... 455/114.3

FOREIGN PATENT DOCUMENTS

CN 101867541 A 10/2010

OTHER PUBLICATIONS

International Search Report received in Application No. PCT/CN2014/073263, mailed May 8, 23014, 13 pages.

* cited by examiner

*Primary Examiner* — Dhaval Patel
(74) *Attorney, Agent, or Firm* — Slater & Matsil, L.L.P.

(57) ABSTRACT

Signal-to-noise ratios (SNRs) and/or amplifier performance can be improved in crest factor reduction (CFR) applications by steering clipping noise in a different direction than the data signal achieving upon reception. Indeed, using clipping noise signals that have a different amplitude-phase relationship than the input/baseline signal causes the clipping noise signal and data signal to exhibit different antenna patterns, effectively steering the clipping noise in a different direction than the data signal. For instance, clipping noise can be steered away from potential receivers to improve received signal quality. In addition, higher magnitude clipping noise can be used to achieve improved power amplifier performance without increasing received SNR.

20 Claims, 9 Drawing Sheets

METHODS AND SYSTEMS FOR BEAM STEERING CREST FACTOR REDUCTION (CFR) CLIP NOISE

TECHNICAL FIELD

The present invention relates generally to wireless communications, and, in particular embodiments, to a system and method for beam steering crest factor reduction clip noise.

BACKGROUND

To meet demands of modern communication networks, power amplifiers are often required to amplify baseband signals in an efficient, yet linear, manner such that substantial gain (i.e., amplification) is achieved without significantly altering frequency characteristics of the resulting signal and otherwise introducing interference. Crest factor reduction (CFR) is a pre-processing technique for reducing a baseband signal's peak-to-average ratio (PAR) prior to amplification, and is intended to improve power-amplifier performance by reducing the baseband signal's PAR (or crest factor) within the amplifier's operable range (e.g., below the threshold in which amplification becomes non-linear).

SUMMARY OF THE INVENTION

Technical advantages are generally achieved, by embodiments of the present invention which describe a system and method for beam steering crest factor reduction clip noise.

In accordance with an embodiment, a method for crest factor reduction (CFR) includes receiving an input signal having an initial magnitude exceeding a CFR threshold, and introducing a clipping noise signal into the input signal to produce an output signal having a resulting magnitude that is less than or equal to the CFR threshold. The clipping noise signal and the input signal have different amplitude-phase relationships such that a resulting phase of the output signal differs from the phase of the input signal. The amplitude-phase relationship of a signal may refer to a ratio between the signal's amplitude component and phase component at a given instance in time. An apparatus for performing this method is also provided.

In accordance with another embodiment, an apparatus for performing crest factor reduction includes an input interface for receiving an input signal, and a CFR module coupled to the input interface. The CFR module is configured to determine whether the input signal has an initial magnitude exceeding a CFR threshold, and in instances when the initial input signal magnitude exceeds the CFR threshold, introduce a clipping noise signal into the input signal to obtain an output signal having a resulting magnitude that is less than or equal to the CFR threshold. The clipping noise signal and the input signal have different amplitude-phase relationships such that a resulting phase of the output signal differs from an initial phase of the input signal.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The structure and use of embodiments of this disclosure are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Beamforming is a signal processing technique that exploits constructive and destructive interference of waveforms to achieve spatial selectivity and/or desired directional characteristics in the radiated signal. Conventional advanced antenna systems (AAS) beamforming techniques apply digital beamforming (DBF) weights to the baseband signal of the various transmission (TRx) paths that source an antenna array to achieve the desired antenna pattern. In many networks, transmitters employ both CFR and beamforming to achieve enhanced wireless performance. In such networks, the antenna pattern of the clipping noise signal (introduced during CFR) closely resembles that of the data signal, meaning that both the data signal and the clipping noise are steered towards the intended receivers. However, clipping noise can interfere with signal reception at the receiver. In recognition of this problem, aspects of the invention provide for steering of clipping noise in a different direction than the data signal, e.g., away from the potential receivers. As discussed herein, the clipping noise is steered in a different direction than the data signal when the clipping noise signal and the data signal exhibit different antenna patterns, which causes a received signal power differential between the clipping noise signal and the data signal to vary across different spatial locations. Further, the clipping noise is considered to be steered away from potential receivers when a peak (e.g., points having relatively high gain) in the clipping noise signal's antenna pattern is shifted from a spatial location having a relatively high density of receivers to a spatial location having a relatively low density of receivers.

Aspects of this disclosure provide improved spatial selectivity by steering the clipping noise in a different direction than the data signal, thereby achieving higher signal-to-noise ratios upon reception. Conventional CFR processing techniques apply clipping noise vectors that are 180 degrees out of phase with the data signal vector such that the clipping noise signal has an identical amplitude-phase relationship as the baseline signal, thereby causing the clipping noise to be steered in the same direction as the signal. In contrast, aspects of this disclosure generate a clipping noise signal that has a different amplitude-phase relationship than the input/baseline signal, which causes the clipping noise signal and data signal to exhibit different antenna patterns (e.g., effectively steering the clipping noise in a different direction than the data signal). Hence, aspects of this disclosure enable transmitters to steer clipping noise away from potential receivers, thereby allowing for better signal quality (e.g., higher signal-to-noise ratios (SNRs)) and/or enhanced power amplifier performance (e.g., clip noise magnitude can be increased to reduce PAR without reducing received SNR).

Figure 1:
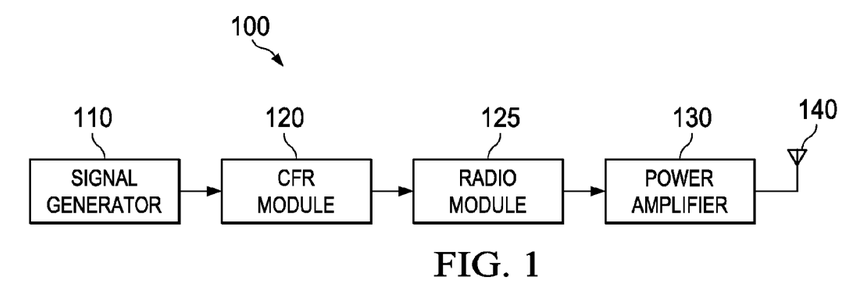
FIG. 1 illustrates a diagram of a clipping noise circuit.
Figure 2A:
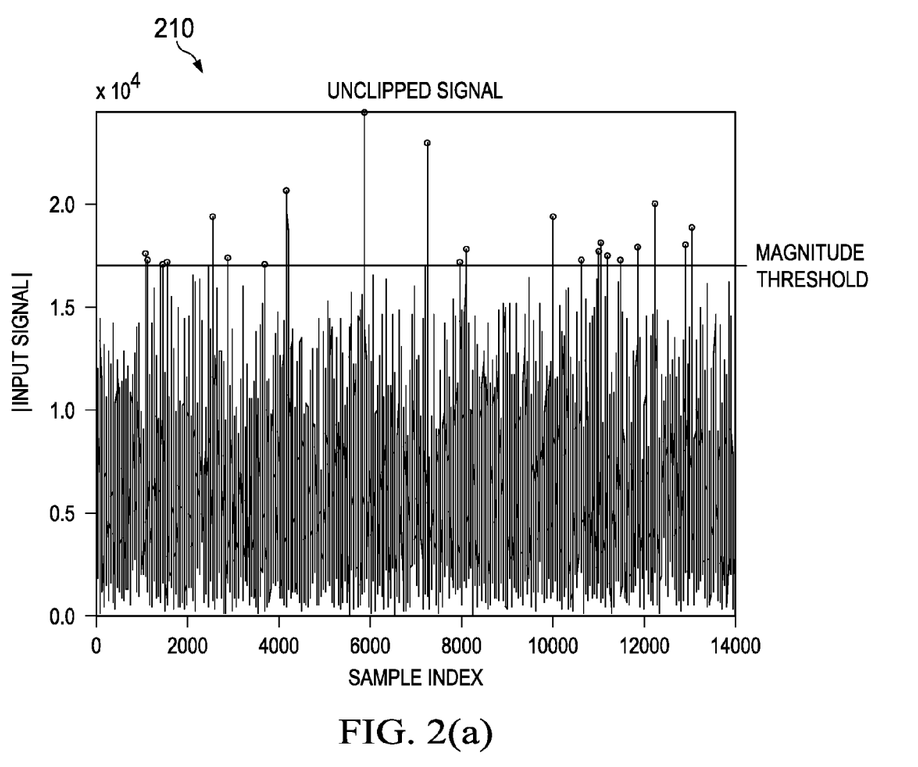
FIG. 2(a) illustrates a time domain plot of an unclipped signal.
Figure 2B:
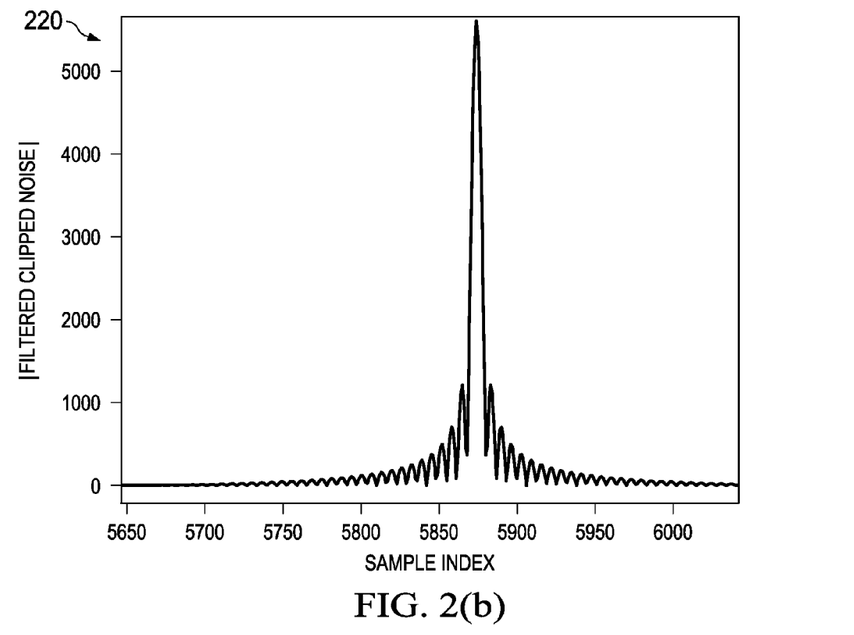
FIG. 2(b) illustrates a time domain plot of a clipping noise signal.
Figure 2C:
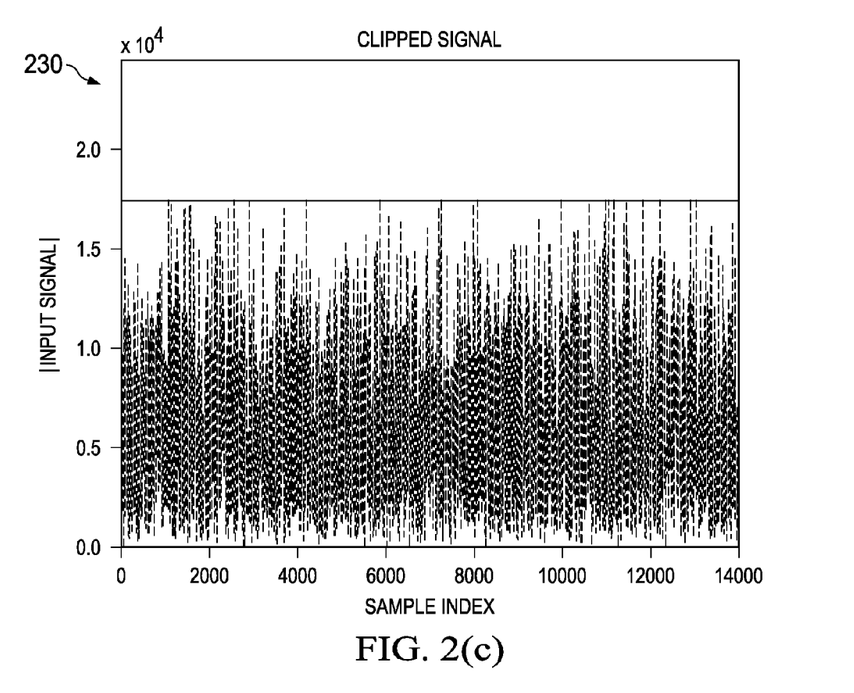
FIG. 2(c) illustrates a time domain plot of a clipped signal and an unclipped signal.
Figure 2D:
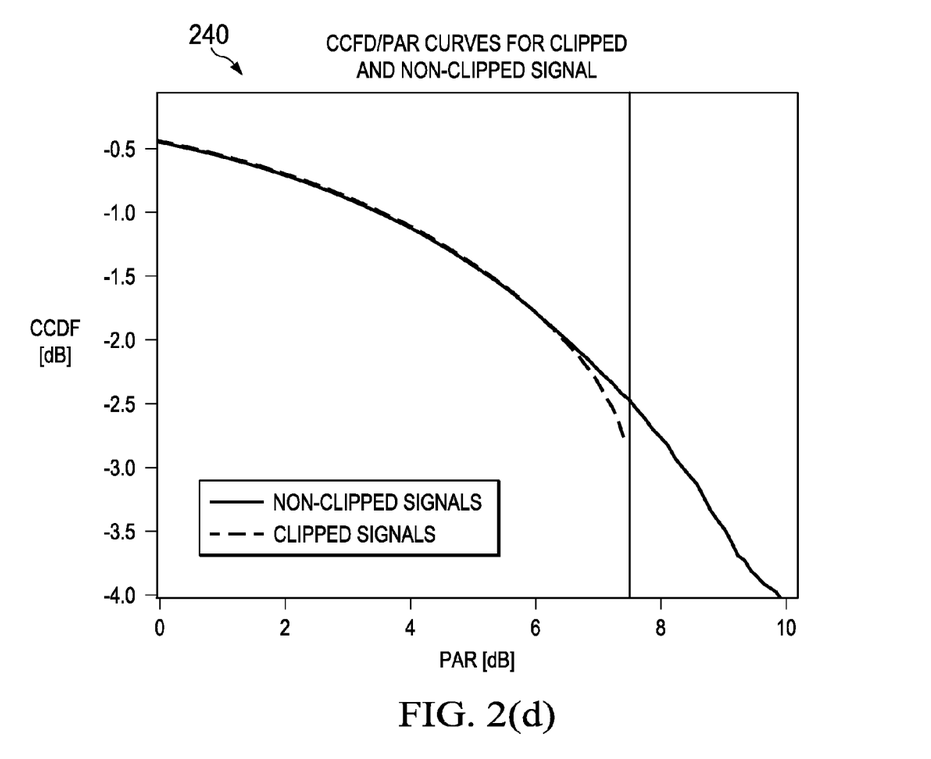
FIG. 2(d) illustrates a chart of a complementary cumulative distribution function (CCDF) of the clipped and unclipped signals.

FIG. 1 illustrates a noise clipping circuit 100 comprising a signal generator 110, a CFR module 120, a radio module 125, a power amplifier 130, and a transmit antenna 140. The signal generator 110 is configured to generate a digital signal, which is processed by the CFR module 120 before being converted into a radio frequency (RF) signal by the radio module 125. The RF signal is then amplified by the power amplifier 130 and transmitted over the transmit antenna 140. FIG. 2(a) illustrates a diagram 210 of a time domain plot of an unclipped signal, as may be generated by the signal generator 110. Notably, the unclipped signal has peaks (i.e., portions of the signal exceeding the magnitude threshold), which are circled in the diagram 210. FIG. 2(b) illustrates a diagram 220 of a clipping noise signal, as may be generated by the CFR module 120. Notably, the noise signal depicted in the diagram 220 is introduced into the unclipped signal depicted in the diagram 210 to clip or otherwise eliminate many or all of the signal peaks. FIG. 2(c) illustrates a diagram 230 of a clipped signal. As shown, most of the peaks in the unclipped signal have been removed from the clipped signal. FIG. 2(d) illustrates a chart 240 of a complementary cumulative distribution function (CCDF) of the clipped and unclipped signals. As shown, the clipped signal has a far lower probability of exceeding the magnitude threshold than the unclipped signal, and consequently will allow the power amplifier 130 to operate more efficiently and/or in a more linear fashion.

Figure 3:
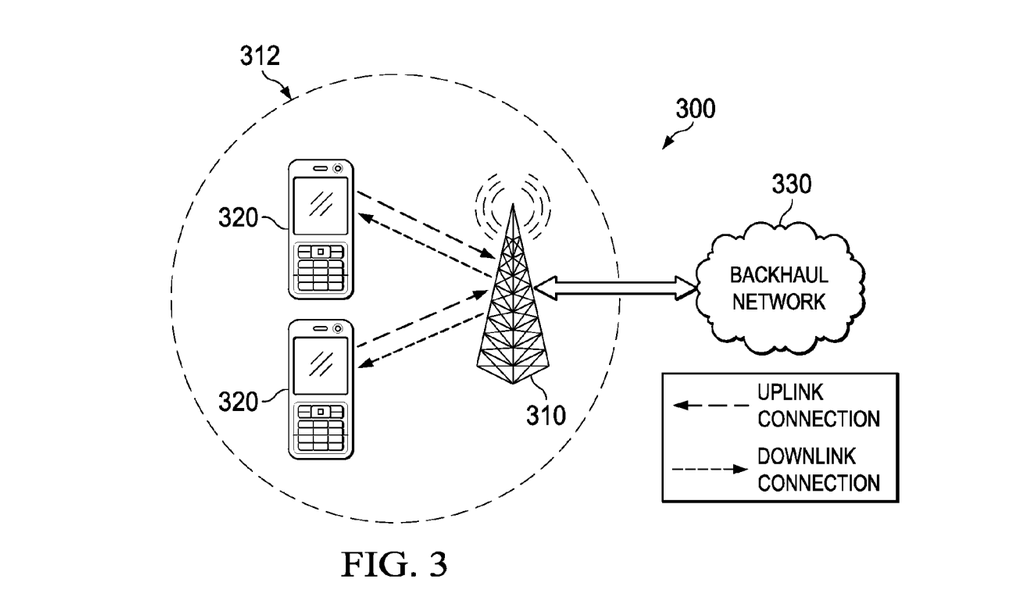
FIG. 3 illustrates a diagram of a communications network.

FIG. 3 illustrates a network 300 for communicating data. The network 300 comprises an access point (AP) 310 having a coverage area 312, a plurality of user equipments (UEs) 320, and a backhaul network 330. The AP 310 may comprise any component capable of providing wireless access by, inter alia, establishing uplink (dashed line) and/or downlink (dotted line) connections with the UEs 320, such as a base station, an enhanced base station (eNB), a femtocell, and other wirelessly enabled devices. The UEs 320 may comprise any component capable of establishing a wireless connection with the AP 310, such as "smartphone", mobile terminal, PC, tablet, netbook and the like. The backhaul network 330 may be any component or collection of components that allow data to be exchanged between the AP 310 and a remote end (not shown). In some embodiments, the network 300 may comprise various other wireless devices, such as relays, femtocells, etc.

Figure 4:
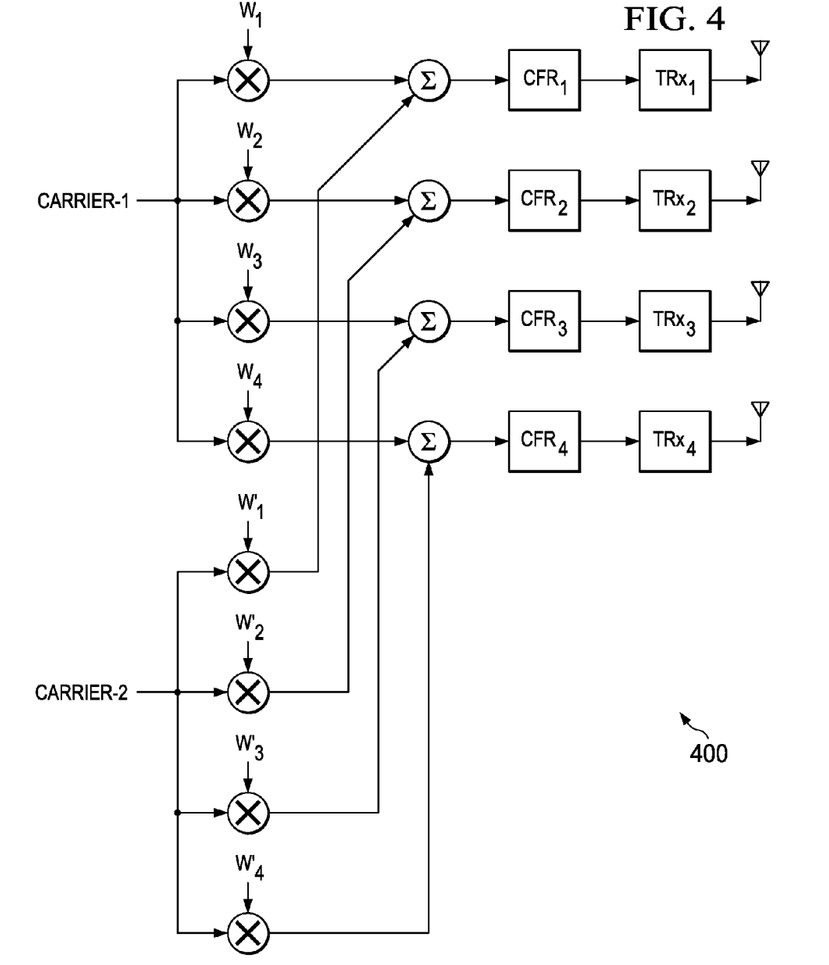
FIG. 4 illustrates a diagram of a conventional multi-carrier multi-channel transmitter.

FIG. 4 illustrates a conventional multi-carrier multi-channel transmitter 400 that includes a first carrier (Carrier-1) and a second carrier (Carrier-2). As shown, both carriers are split into four transmit paths (TRx paths), after which a first set of beamforming weight vectors ($W_1, W_2, W_3, W_4$) are applied to the paths of the Carrier-1 and a second set of beamforming weight vectors ($W_1', W_2', W_3', W_4'$) are applied to the paths of the Carrier-2. Thereafter, the combined signals traveling over each of the TRx paths are clipped by the CFR modules ($CFR_1$, $CFR_2$, $CFR_3$, $CFR_4$) before being transmitted over the antennas by the transmitter modules ($TRx_1, TRx_2, TRx_3, TRx_4$).

Figure 5:
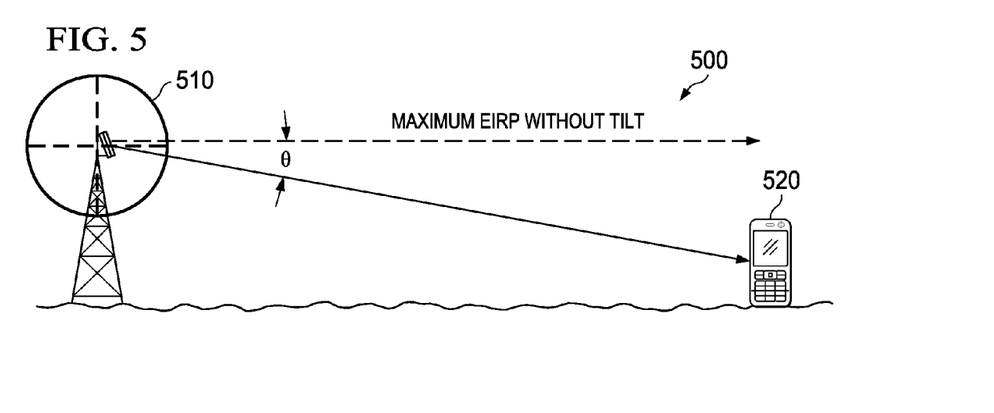
FIG. 5 illustrates a time domain plot of unfiltered clipping noise.
Figure 6:
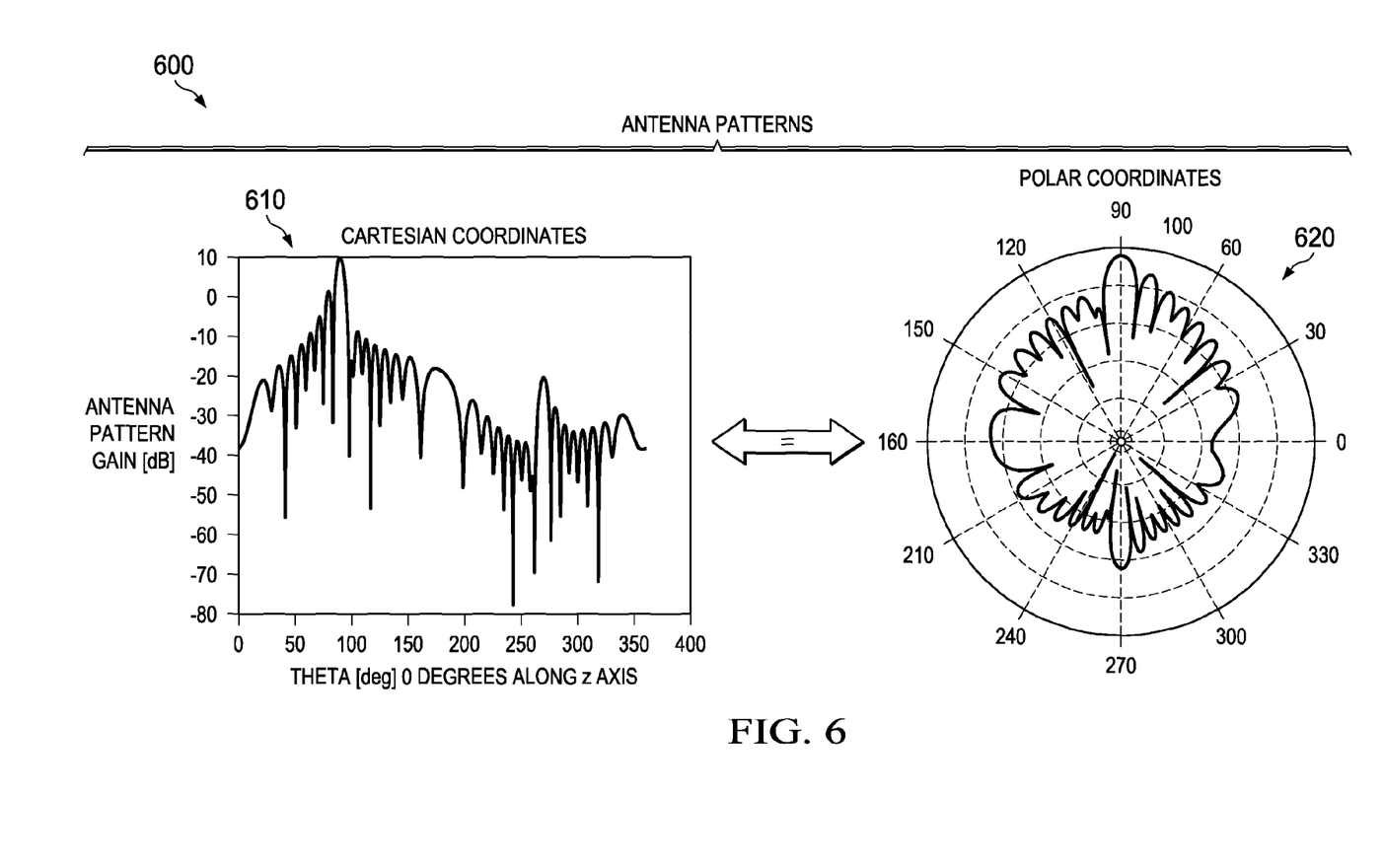
FIG. 6 illustrates a graph of an antenna pattern.

FIG. 5 illustrates a network 500 in which a cell tower 510 is transmitting a signal to a mobile station 520. The cell tower 510 has a maximum Effective Isotropically Radiated Power (EIRP) trajectory as represented by the dashed arrowhead extending horizontally from the cell tower's 510 antenna. Accordingly, the cell tower 510 may electronically tilt its antenna downward by a tilt angle (θ) in order to achieve a higher SNR at the mobile station 520. FIG. 6 shows an antenna pattern graphed with Cartesian coordinates 610 and polar coordinates 620. As shown, some spatial positions (e.g., 240 degrees) show higher gain than others, which allows for better signal reception quality at those respective locations.

Figure 7:
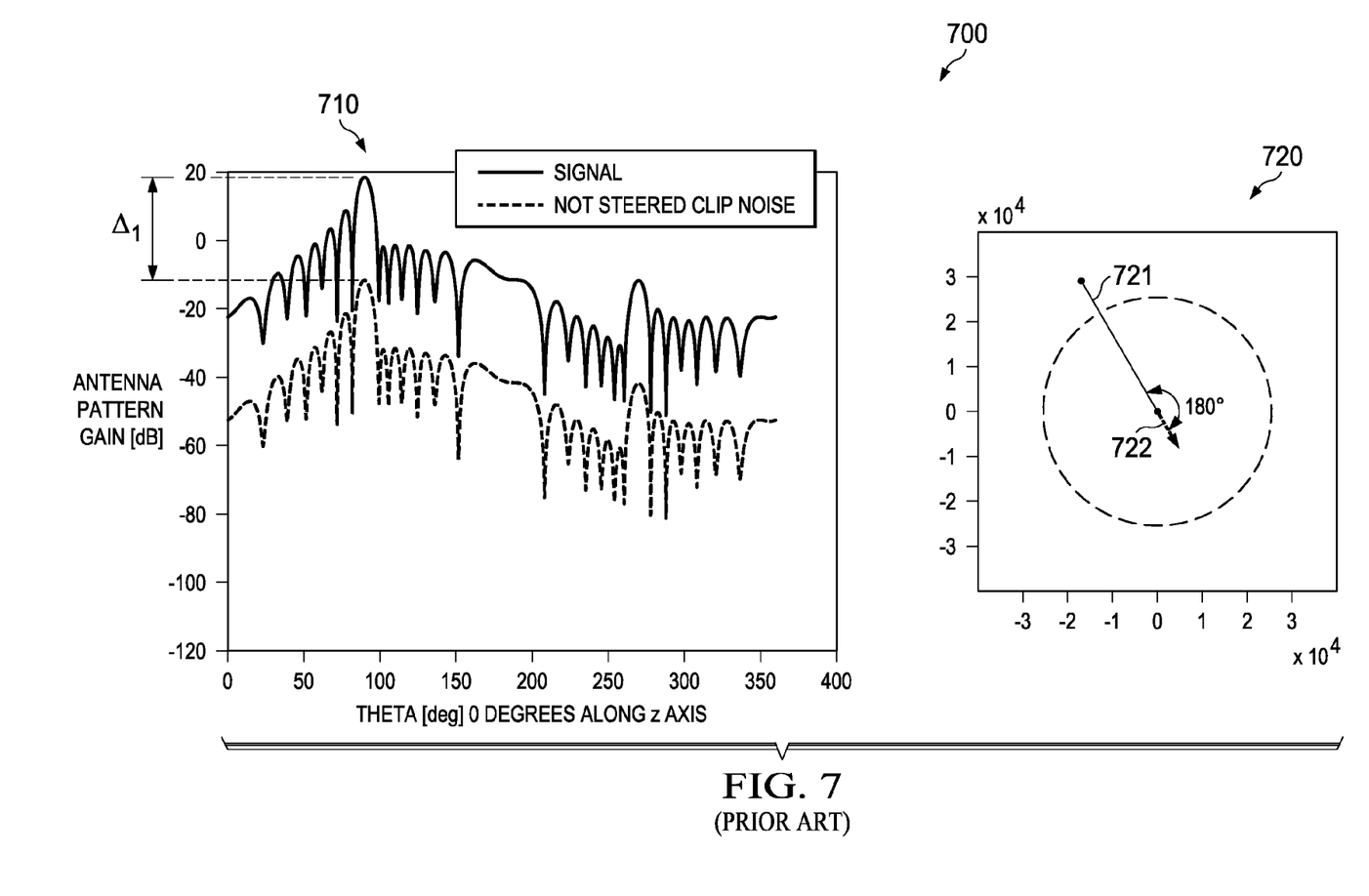
FIG. 7 illustrates a diagram of an antenna pattern resulting from a conventional crest factor reduction technique.

Traditionally, since the CFR processing block occurs post DBF application, the crest factor reduction includes introducing a clipping noise signal that has the same relative amplitude-phase relationship as the data signal. The amplitude-phase relationship of a signal may refer to a ratio between the signal's amplitude component and phase component at a given instance in time. In some cases, the phases/amplitudes discussed herein are measured at the antenna point, represent relative values which are computed in accordance with a distributed beamforming (DBF) application/function to steer a beam in a desired direction. FIG. 7 illustrates an antenna pattern 710 for a signal and clipped signal as might result from a conventional CFR technique, as is demonstrated in the diagram 720. More specifically, traditional crest factor is achieved by introducing a clipping noise vector 722 into an unclipped signal 721 to reduce the magnitude of the resulting clipped signal to within a CFR threshold (indicated by the dashed circle in the diagram 720). As shown, the amplitude-phase relationships of the clipping noise vector 722 and the unclipped signal 721 are identical, with the clipping noise vector being 180 degrees out of phase with the unclipped signal 721. As a result, the clipping noise and the data signal have a similar antenna pattern, with the clipped signal having a lower gain than the data signal. For instance, the clipping noise signal and the data signal both peak at around 90 degrees, with a difference ($\Delta_1$) of about 30 decibels (dBs).

Figure 8:
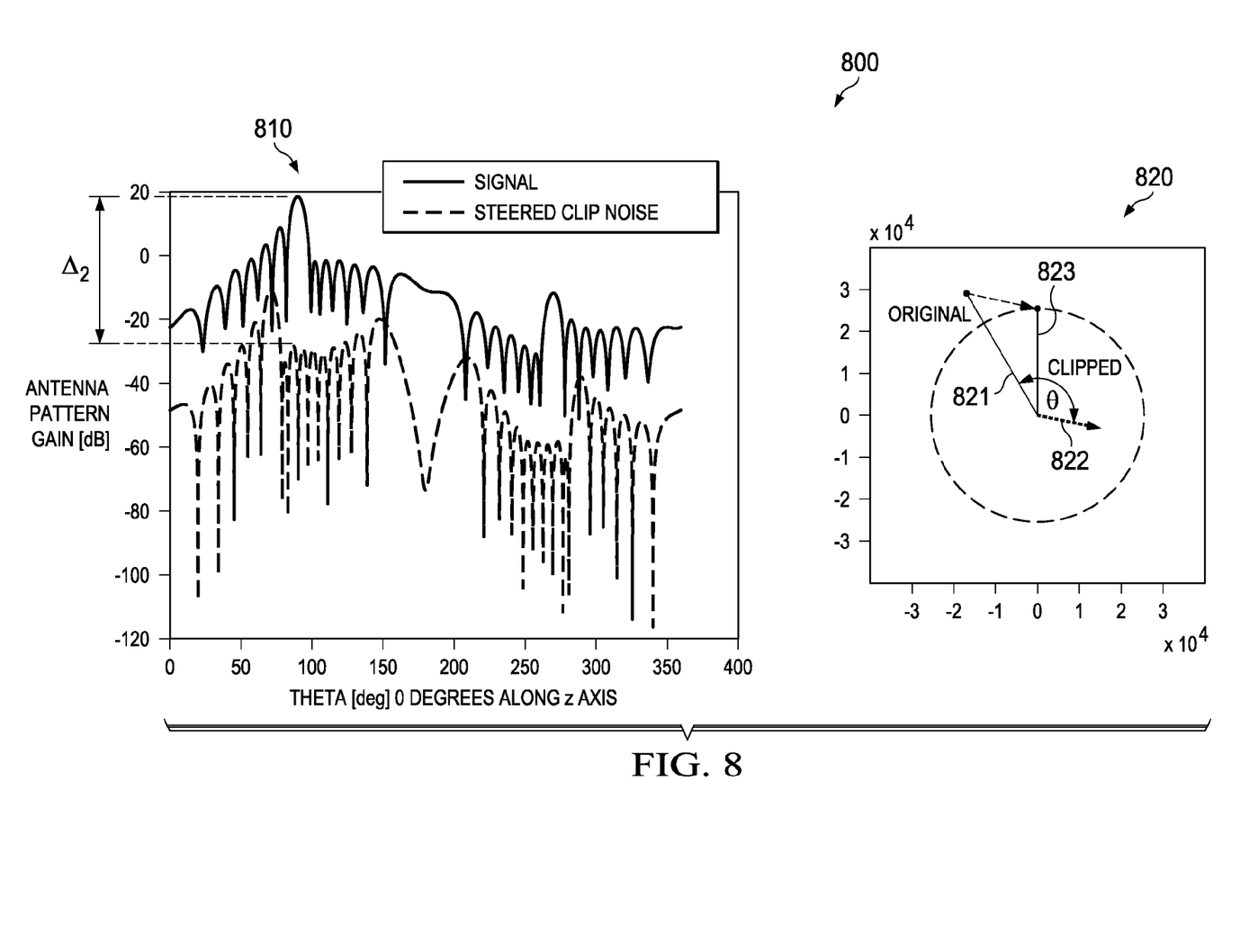
FIG. 8 illustrates a diagram of an antenna pattern resulting from an embodiment crest factor reduction technique.
Figure 9:
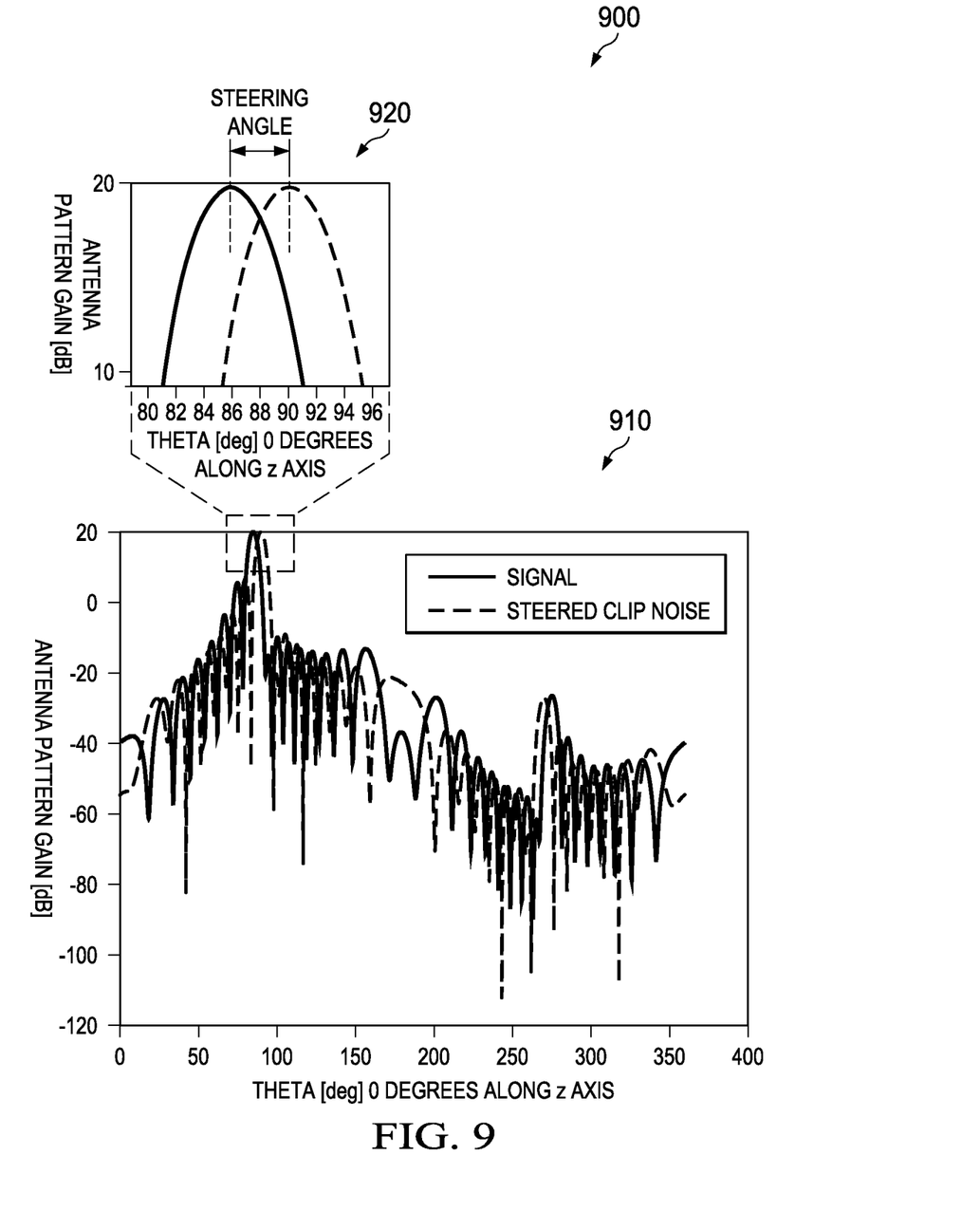
FIG. 9 illustrates a diagram of a normalized antenna pattern resulting an embodiment crest factor reduction technique.

It may be desirable to steer the clipping noise signal away from the data signal for reasons discussed above. FIG. 8 illustrates an antenna pattern 810 for a signal and clipped signal as might result from an embodiment CFR techniques performed in accordance with aspects of this disclosure, as is demonstrated in the diagram 820. More specifically, embodiments of this disclosure achieve crest factor reduction by introducing into the unclipped signal 821 a clipping noise vector 822 having a different amplitude-phase relationship than the unclipped signal 821. As a result, the relative phasing of the resulting clipped signal 823 differs from that of the unclipped signal 821. The advantages are two-fold. On one hand, a larger magnitude clipping noise vector 821 may be used, thereby allowing for the power amplifier to operate in a more efficient (e.g., linear) operating region. On the other hand, the antenna pattern of the clipping noise signal can be steered in a different direction than the data signal, thereby allowing for increased spatial selectivity. For instance, the clipped signal could be steered away from potential user locations, thereby increasing SNRs of those users. This is exemplified by the antenna pattern 810, which shows a difference ($\Delta_2$) of about 45 decibels (dBs) at the 90 degrees (where the signal peaks), which is about 15 dBs greater than the $\Delta_1$ obtained through conventional CFR. Hence, a user positioned at a spatial location corresponding to 90 degrees would have a higher SNR under the embodiment CFR technique demonstrated in diagram 820 than the conventional CFR technique demonstrated in diagram 720. FIG. 9 illustrates a graph 910 of normalized antenna patterns, where the amplitudes of the data signal and the steered clip noise signal have been normalized to better show the difference (or steering angle) between the signal and steered clip signal. As shown, a steering angle of approximately 5 degrees is attainable.

Figure 10:
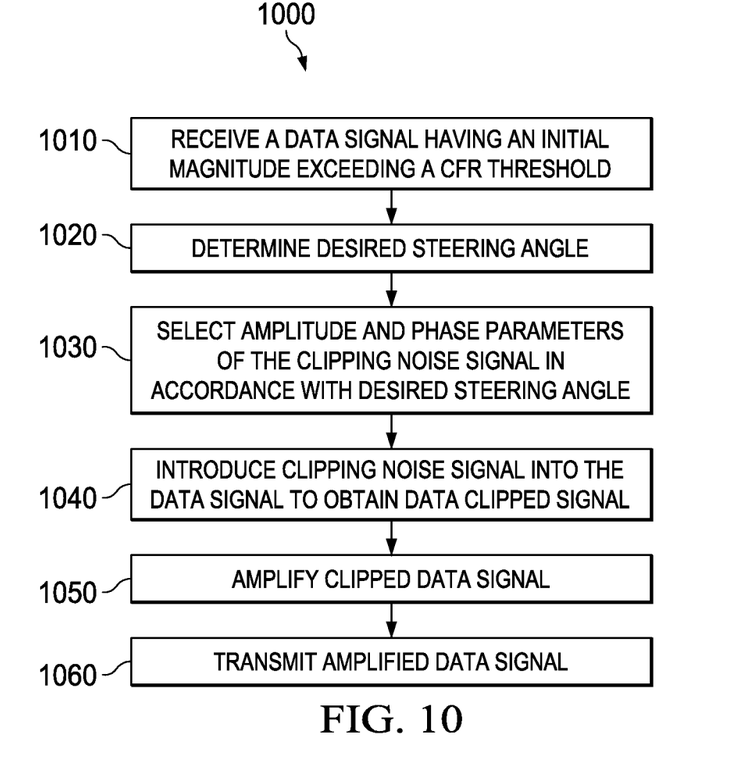
FIG. 10 illustrates a flowchart of an embodiment method for performing crest factor reduction.

FIG. 10 illustrates a flowchart of a method 1000 for performing crest factor reduction in accordance with aspects of this disclosure, as might be performed by a transmitter. As shown, the method 1000 begins at step 1010, where the transmitter receives a data signal that is determined by a CFR module of the transmitter to have an initial magnitude that exceeds a CFR threshold. Next, the method 1000 proceeds to step 1020, where the transmitter determines a desired steering angle for the signal transmission. In embodiments, the transmitter may determine the desired steering angle in accordance with a distribution of users throughout a cell or coverage area. For instance, the steering angle may be selected such that the clipping noise signal's antenna pattern has relatively low gain in spatial locations having a high density of users. Thereafter, the method 1000 proceeds to step 1030, where the transmitter selects amplitude and phase parameters of the clipping noise signal in accordance with the desired steering angle. In an embodiment, the amplitude and phase parameters of the clipping noise signal may be selected such that the amplitude-phase relationship of the clipping noise signal is different than an amplitude-phase relationship of the unclipped signal. The degree to which the amplitude-phase relationships differ may be a function of the steering angle determined in step 1020. Next, the method 1000 proceeds to step 1040, where the transmitter introduces the clipping noise signal into the data signal to obtain a clipped data signal. Subsequently, the method 1000 proceeds to step 1050, where the transmitter amplifies the clipped data signal. Finally, the method 1000 proceeds to step 1060, where the transmitter transmits the amplified data signal.

Figure 11:
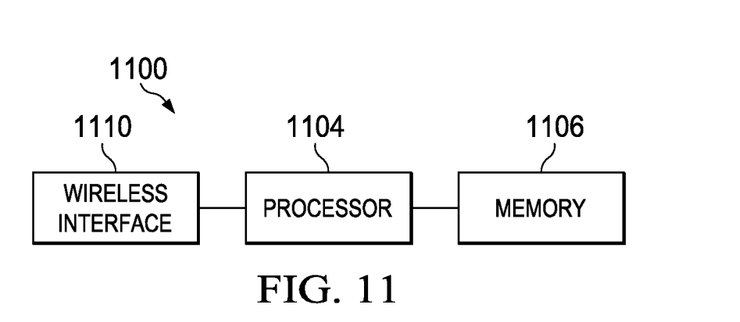
FIG. 11 illustrates a block diagram of an embodiment communications device.

FIG. 11 illustrates a block diagram of an embodiment of a communications device 1100. The communications device 1100 may include a processor 1104, a memory 1106, and a plurality of wireless interfaces 1110. The processor 1104 may be any component capable of performing computations and/or other processing related tasks, and the memory 1106 may be any component capable of storing programming and/or instructions for the processor 1104. The interface 1110 may be any component or collection of components that allows the communications device 1100 to communicate wirelessly.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for crest factor reduction (CFR), the method comprising:
   receiving an input signal having an initial magnitude exceeding a CFR threshold; and
   introducing a clipping noise signal into the input signal to produce an output signal having a resulting magnitude that is less than or equal to the CFR threshold,
   wherein the clipping noise signal and the input signal have different amplitude-phase relationships such that a resulting phase of the output signal differs from an initial phase of the input signal, and
   wherein the clipping noise signal has a different phase than the input signal.

2. A method for crest factor reduction (CFR), the method comprising:
   receiving an input signal having an initial magnitude exceeding a CFR threshold; and
   introducing a clipping noise signal into the input signal to produce an output signal having a resulting magnitude that is less than or equal to the CFR threshold,
   wherein the clipping noise signal and the input signal have different amplitude-phase relationships such that a resulting phase of the output signal differs from an initial phase of the input signal,
   determining a desired steering angle in accordance with a distribution of users in a cell to increase a signal to noise ratio (SNR) at a location of one or more of the users; and
   selecting amplitude and phase parameters of the clipping noise signal in accordance with desired steering angle.

3. The method of claim 2, wherein selecting amplitude and phase parameters of the clipping noise signal in accordance with desired steering angle comprises:
   selecting the phase component of the clipping noise signal such that the clipping noise signal and the input signal do not have an opposite phase relationship; and
   selecting an amplitude component of the clipping noise signal in accordance with the phase component of the clipping noise signal such that a magnitude of the clipping noise signal was sufficient for performing CFR on the input signal.

4. The method of claim 1, wherein the clipping noise signal and the input signal have an inapposite phase relationship such that a phase difference between the clipping noise signal and the input signal is not equal to $\Pi$ (180 degrees).

5. The method of claim 4, wherein a phase difference between the clipping noise signal and the input signal has an absolute value that is less than $\Pi$ (180 degrees) but greater than $\Pi/2$ (90 degrees).

6. The method of claim 4, wherein a phase difference between the clipping noise signal and the input signal has an absolute value that is greater than $\Pi$ (180 degrees) but less than $3\Pi/2$ (170 degrees).

7. The method of claim 1, wherein the clipping noise signal has a different antenna pattern than the clipped signal.

8. The method of claim 1 further comprising transmitting the clipped signal over a plurality of wireless interfaces.

9. An apparatus for performing crest factor reduction (CFR), the apparatus comprising:
   a processor; and
   a non-transitory computer readable storage medium storing programming for execution by the processor, the programming including instructions to:
   receive an input signal having an initial magnitude that exceeds a CFR threshold; and
   introduce a clipping noise signal into the input signal to produce an output signal having a resulting magnitude that is less than or equal to the CFR threshold,
   wherein the clipping noise signal and the input signal have different amplitude-phase relationships such that a resulting phase of the output signal differs from an initial phase of the input signal, and wherein the clipping noise signal has a different phase than the input signal.

10. The apparatus of claim 9, wherein the programming further comprises instructions to:
 determine a desired steering angle in accordance with a distribution of users in a cell to increase a signal to noise ratio (SNR) at a location of one or more of the users; and
 select amplitude and phase parameters of the clipping noise signal in accordance with desired steering angle.

11. The apparatus of claim 10, wherein the instructions to select amplitude and phase parameters of the clipping noise signal in accordance with the desired steering angle include instructions to:
 select the phase component of the clipping noise signal such that the clipping noise signal and the input signal do not have an opposite phase relationship.

12. The apparatus of claim 9, wherein the clipping noise signal and the input signal have an inapposite phase relationship such that a phase difference between the clipping noise signal and the input signal is not equal to Π (180 degrees).

13. The apparatus of claim 12, wherein a phase difference between the clipping noise signal and the input signal has an absolute value that is less than Π (180 degrees) but greater than Π/2 (90 degrees).

14. The apparatus of claim 12, wherein a phase difference between the clipping noise signal and the input signal has an absolute value that is greater than Π (180 degrees) but less than 3Π/2 (170 degrees).

15. The apparatus of claim 9, wherein the clipping noise signal has a different antenna pattern than the clipped signal.

16. The apparatus of claim 9, further comprising transmitting the clipped signal over a plurality of wireless interfaces.

17. An apparatus comprising:
 an input interface for receiving an input signal; and
 a crest factor reduction (CFR) module coupled to the input interface, the CFR module configured to: determine that the input signal has an initial magnitude that exceeds a CFR threshold; and introduce a clipping noise signal into the input signal to obtain an output signal having a resulting magnitude that is less than or equal to the CFR threshold, wherein the clipping noise signal and the input signal have different amplitude-phase relationships such that a resulting phase of the output signal differs from an initial phase of the input signal, and
 wherein the clipping noise signal has a different phase than the input signal.

18. The apparatus of claim 17, wherein the clipping noise signal and the input signal have an inapposite phase relationship such that a phase difference between the clipping noise signal and the input signal is not equal to Π (180 degrees).

19. The apparatus of claim 17, further comprising:
 an antenna array; and
 an amplifier module positioned in-between the CFR module and the antenna array, the amplifier module configured to amplify the output signal to produce an amplified output signal;
 and forward the amplified output signal to the antenna array for transmission over a network.

20. The apparatus of claim 19, wherein the CFR module and the amplifier module are constructed using field programmable gate arrays.

* * * * *